(12) United States Patent
Snapkauskas et al.

(10) Patent No.: US 7,937,664 B2
(45) Date of Patent: May 3, 2011

(54) METHOD AND SYSTEM FOR PROVIDING AN EXTENSIBLE USER INTERFACE

(75) Inventors: Darius Snapkauskas, Redmond, WA (US); Alexander A. Sourov, Seattle, WA (US); Preethi Ramani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 389 days.

(21) Appl. No.: 12/111,908

(22) Filed: Apr. 29, 2008

(65) Prior Publication Data
US 2009/0094526 A1   Apr. 9, 2009

Related U.S. Application Data

(63) Continuation of application No. 10/317,622, filed on Dec. 12, 2002, now Pat. No. 7,366,991.

(51) Int. Cl.
G06F 3/00 (2006.01)
G06F 9/00 (2006.01)
G06F 17/00 (2006.01)

(52) U.S. Cl. ......... 715/762; 715/760; 715/811; 717/100
(58) Field of Classification Search .............. 715/760, 715/762, 763, 764, 765, 744, 811; 717/168, 717/100
See application file for complete search history.

(56) References Cited

U.S. PATENT DOCUMENTS

| | | | |
|---|---|---|---|
| 6,476,828 B1 | 11/2002 | Burkett et al. | |
| 6,567,846 B1 | 5/2003 | Garg et al. | |
| 6,697,754 B1 | 2/2004 | Alexander | |
| 6,915,486 B2 | 7/2005 | Li et al. | |
| 6,920,607 B1 | 7/2005 | Ali et al. | |
| 6,948,133 B2 | 9/2005 | Haley | |
| 6,976,218 B2 | 12/2005 | Stanford-Clark et al. | |
| 6,990,654 B2 | 1/2006 | Carroll, Jr. | |
| 7,127,677 B2 * | 10/2006 | Chou | 715/741 |
| 7,366,991 B1 | 4/2008 | Snapkauskas et al. | |
| 2002/0077829 A1 | 6/2002 | Brennan et al. | |
| 2002/0194186 A1 | 12/2002 | Ode | |
| 2003/0025732 A1 * | 2/2003 | Prichard | 345/765 |
| 2003/0117432 A1 * | 6/2003 | Kautto-Kiovula et al. | 345/735 |
| 2004/0125130 A1 * | 7/2004 | Flamini et al. | 345/738 |
| 2005/0066270 A1 | 3/2005 | Ali et al. | |

OTHER PUBLICATIONS

Harahan, Tim, Microsoft Corporation, "Introduction to Customizing the Microsoft Project Guide," Jun. 2002, pp. 1-21.
Microsoft Corporation, "Microsoft Inductive User Interface Guidelines," Feb. 9, 2001, pp. 1-19.
Ramani, Preethi, et al., Microsoft Corporation, "Microsoft Project 2002 Project Guide Architecture and Extensibility," Jun. 2002, pp. 1-14.

* cited by examiner

Primary Examiner — Tadeese Hailu
Assistant Examiner — Anita D Chaudhuri
(74) Attorney, Agent, or Firm — Perkins Coie LLP

(57) ABSTRACT

Displaying a custom user interface in response to a determination that the application program is configured to display the custom user interface. To create the custom user interface, the end user can customize one or more default user interface files to create custom user interface files. The default user interface files can comprise one or more of a structure definition file, a content definition file, and a content display file. Additionally, the custom user interface can be associated with a program module function that can execute in connection with displaying the custom user interface.

19 Claims, 10 Drawing Sheets

METHOD AND SYSTEM FOR PROVIDING AN EXTENSIBLE USER INTERFACE

CROSS REFERENCE TO RELATED APPLICATION

This application is a continuation application of U.S. Pat. No. 7,366,991, issued Apr. 29, 2008, and entitled "METHOD AND SYSTEM FOR PROVIDING AN EXTENSIBLE USER INTERFACE," which is hereby incorporated in its entirety by reference.

FIELD OF THE INVENTION

The present invention relates to a user interface for a computer program module. Particularly, the present invention relates to an extensible user interface that can be modified by an end user.

BACKGROUND OF THE INVENTION

Conventional computer program modules, such as application programs, provide a default user interface for all end users of the product. The program module comprises computer software code that generates the user interface. However, an end user cannot modify the default user interface without de compiling and rewriting the computer software code of the program module. Accordingly, conventional program modules provide a "take it or leave it" approach to presenting a user interface for the end user. If the end user finds the default user interface hard to use or lacking desired functionality, then the end user may search for another program module with a more user-friendly default user interface and having the desired functionality. Alternatively, the end user may develop a custom program module having the desired user interface and functionality. End users also may develop standardized operations and formatting based upon the format of information provided by a program module having the desired functionality. Such an end user will resist transitioning to a new program module providing improved functionality if the new user interface does not provide information in the existing format of their own business method.

To provide a more user-friendly default user interface, conventional program modules can offer a configurable user interface in which the end user can select preprogrammed features. Typically, the program module executes a set-up mode during installation by the end user. During the set-up mode, the end user can configure the default user interface by selecting predetermined options. The end user also can configure the default user interface at a subsequent time by selecting other predetermined options. The program module then displays the default user interface configured by the end user and having the selected options. However, the end user can select from only the predetermined options. Then, that program module presents a "take it or leave it" approach to providing a user interface having only options selected from an available set of predetermined display options. Thus, that prior type of configurable user interface does not overcome the problems of the conventional user interface discussed above.

Accordingly, there is need in the art for a program module user interface that can be customized by the end user. A need also exists for a user interface that the end user can customize without decompiling the program module's software code. Additionally, a need exists for a user interface that the end user can customize to include desired content and functionality for the end user's particular business method. A need also exists for associating a program module file with a custom user interface so that the program module displays the custom user interface upon opening the program module file. Furthermore, a need exists in the art for allowing an end user to switch between user interfaces without having to restart the program module.

SUMMARY OF THE INVENTION

The present invention provides a program module user interface that can be customized by an end user based upon modifications to a default user interface. The end user can customize the user interface to include content and functionality desired by the end user without a need for decompiling the program module's software code.

For one aspect of the present invention, a program module can comprise a default structure definition file, a default content definition file, and one or more default content display files for generating a default user interface. The end user can customize the user interface by modifying one or more of the default structure definition file, the content definition file, and the content display files to create one or more custom files. Then, the program module can use the custom files to generate the custom user interface.

In operation, the structure definition file can specify a layout or positioning for content items in the user interface. Typical content items include a goal bar, a side pane, a main viewing area, and other items displayed within the goal bar, side pane, and main viewing area. The structure definition file can reference a content item identification number for each content item. The program module can search the content definition file to find the content item associated with the respective identification number. The program module then displays the content item in the user interface in the position specified in the structure definition file.

Additionally, each content item can have an associated content display file comprising display content corresponding to the content item. The content definition file can map the content item's identification number to a location of the associated content display file. Accordingly, when the end user selects a content item in the user interface, the program module can read the structure definition file to obtain the content identification number for the selected content item. Next, the program module can search the content definition file to obtain the content display file location for the display content mapped to the content item. Then, the program module can load and display in the user interface the display content from the mapped content display file.

To customize the user interface, the end user can modify one or more of the structure definition file, the content definition file, and the content display file that represent the default file(s) for the user interface. For example, the end user can modify the position of content items by modifying the structure definition file. The end user can add or change content items by modifying the content definition file. The end user can add or change display content for a content item by modifying the corresponding content display file, or by adding a new content display file. To modify one of the default files, the end user can modify the actual default file and save the modified file as a custom file. Alternatively, the end user can create a new custom file for use in place of, or in addition to, the default file.

In another aspect of the present invention, the structure definition file and the display content files can comprise a hyper text markup language ("HTML") type file, and the content definition file can comprise an extensible markup language ("XML") type file.

These and other aspects, objects, and features of the present invention will become apparent from the following detailed description of the exemplary embodiments, read in conjunction with, and reference to, the accompanying drawings.

DETAILED DESCRIPTION OF THE EXEMPLARY EMBODIMENTS

Figure 1:
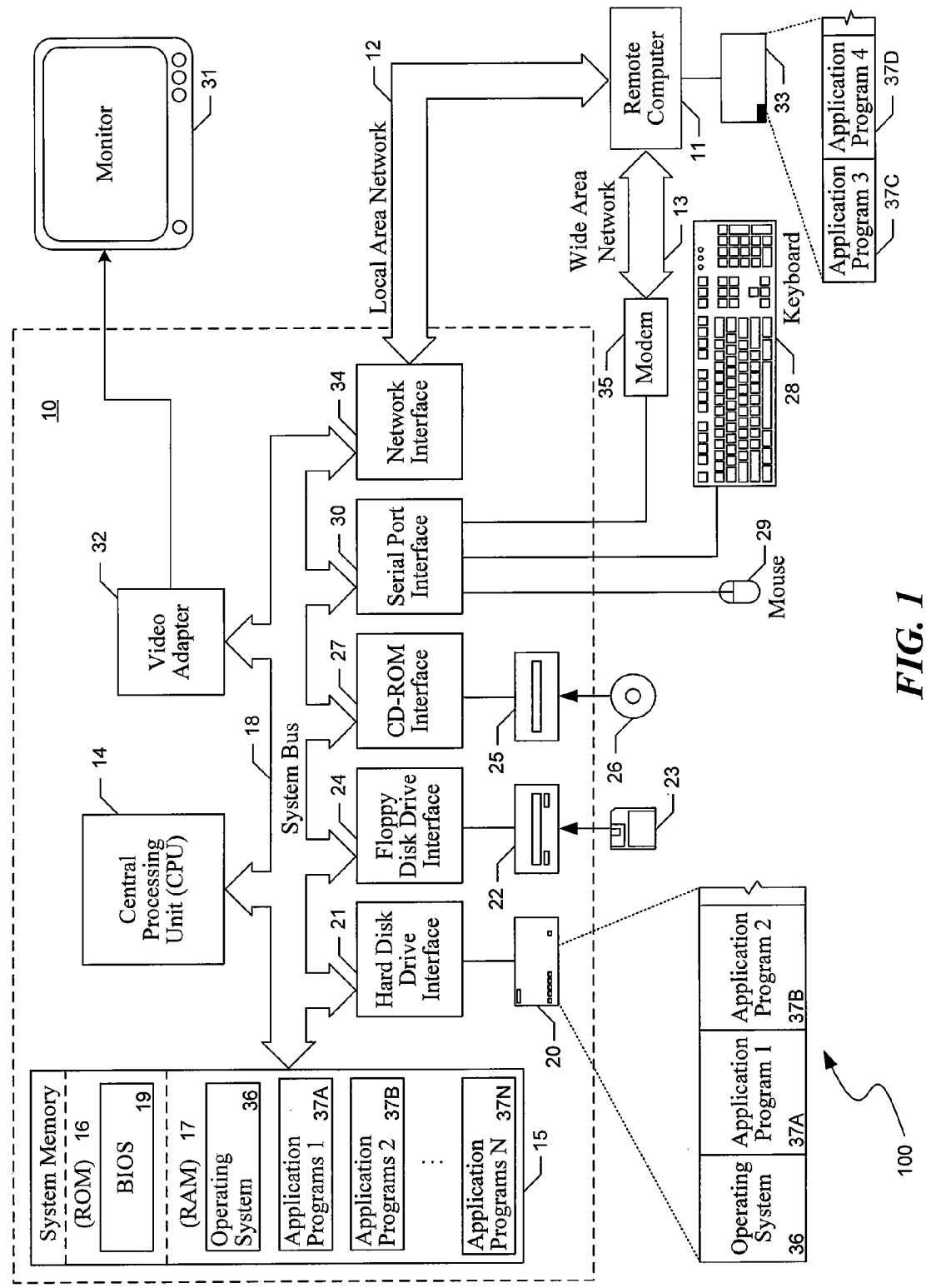
FIG. 1 is a block diagram depicting a conventional personal computer suitable for supporting the operation of embodiments of the present invention.

The present invention can provide a program module user interface that is customizable by an end user. The customized user interface can provide desired content and functionality different from the content and functionality of a default user interface for the program module. Accordingly, an end user in a company or organization can customize the user interface to provide custom steps within a program module's processes, to outline their own unique processes, to add links to additional information, and to present information in the format of the end user's business method. The end user can customize the user interface by adding new content to the default user interface framework or by changing the user interface framework to implement new methodologies and features not yet supported by the program module.

Exemplary embodiments of the present invention will be described generally in the context of software modules running in a computing environment, The processes and operations performed by the software modules include the manipulation of signals by a client or server and the maintenance of those signals within data structures resident in one or more of local or remote memory storage devices. Such data structures impose a physical organization upon the collection of data stored within a memory storage device and represent specific electrical or magnetic elements. Those symbolic representations are the means used by those skilled in the art of computer programming and computer construction to effectively convey teachings and discoveries to others skilled in the art.

The present invention also includes a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the Figures illustrating the program flow.

Referring now to the drawings, in which like numerals represent like elements, aspects of the present invention and exemplary operating environment will be described.

FIG. 1 is a block diagram depicting a conventional personal computer 10 suitable for supporting the operation of embodiments of the present invention. As shown in FIG. 1, the personal computer 10 operates in a networked environment with logical connections to a remote server 11. The logical connections between the personal computer 10 and the remote server 11 are represented by a local area network 12 and a wide area network 13. Those of ordinary skill in the art will recognize that in this client/server configuration, the remote server 11 may function as a file server or computer server.

The personal computer 10 comprises a processing unit 14, such as "PENTIUM" microprocessors manufactured by Intel Corporation of Santa Clara, Calif. The personal computer 10 also includes a system memory 15, comprising read only memory (ROM) 16 and random access memory (RAM) 17, which is connected to the processor 14 by a system bus 18. An exemplary embodiment of the computer 10 utilizes a BIOS 19, which is stored in the ROM 16. Those skilled in the art will recognize that the BIOS 19 is a set of basic routines that helps transfer information between elements within the personal computer 10. Those skilled in the art also will appreciate that the present invention may be implemented on computers having other architectures, such as computers that do not use a BIOS, and those that utilize other microprocessors.

Within the personal computer 10, a local hard disk drive 20 is connected to the system bus 18 via a hard disk drive interface 21. A floppy disk drive 22, which reads or writes a floppy disk 23, is connected to the system bus 18 via a floppy disk drive interface 24. A CD-ROM and/or DVD drive 25, which reads a CD-ROM or DVD 26, is connected to the system bus 18 via a CD-ROM/DVD interface 27. A user enters commands and information into the personal computer 10 by using input devices, such as a keyboard 28 and/or a pointing device, such as a mouse 29, which are connected to the system bus 18 via a serial port interface 30. Other types of pointing devices (not shown in FIG. 1) include track pads, track balls, pens, head trackers, data gloves, and other devices suitable for positioning a cursor on a computer monitor 31. The monitor 31 or other kind of display device is connected to the system bus 18 via a video adapter 32.

The remote server 11 in the networked environment is connected to a remote memory storage device 33. The remote memory storage device 33 is typically a large capacity device such as a hard disk drive, CD-ROM or DVD drive, magneto-optical drive or the like. Those skilled in the art will understand that program modules, such as application program modules 37C and 37D, are provided to the remote server 11 via computer-readable media. The personal computer 10 is connected to the remote server 11 by a network interface 34, which is used to communicate over the local area network 12.

In an alternative embodiment, the personal computer 10 is connected to the remote server 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art can recognize that the modem 35 also may be internal to the personal computer 10, thus communicating directly via the system bus 18. Connection to remote server 11 via both the local area network 12 and the wide area network 13 is not required, but merely illustrates alternative methods of providing a communication path between the personal computer 10 and the remote server 11.

Although other internal components of the personal computer 10 are not shown. Those of ordinary skill in the art will appreciate that such components and the interconnection between them are well known. Accordingly, additional details concerning the internal construction of the personal computer 10 need not be disclosed in connection with the present invention.

Those skilled in the art will understand that program modules, such as an operating system 36, a representative application program module 37A, a web browser application program module 37B, other program modules 37N, and data are provided to the personal computer 10 via computer-readable media. The program modules 37N can comprise application programs or other program types that can provide a customizable user interface on the monitor 31 according to an exemplary embodiment of the present invention. In an exemplary computer 10, the computer-readable media include the local or remote memory storage devices, which may include the local hard disk drive 20, floppy disk 23, CD-ROM or DVD 26, RAM 17, ROM 16, and the remote memory storage device 33. In another exemplary personal computer 10, the local hard disk drive 20 is used to store data and programs, including user interface default files, such as a structure definition file, a content definition file, and a content display file.

Those skilled in the art will appreciate that the present invention may be implemented in other computer system configurations, including hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
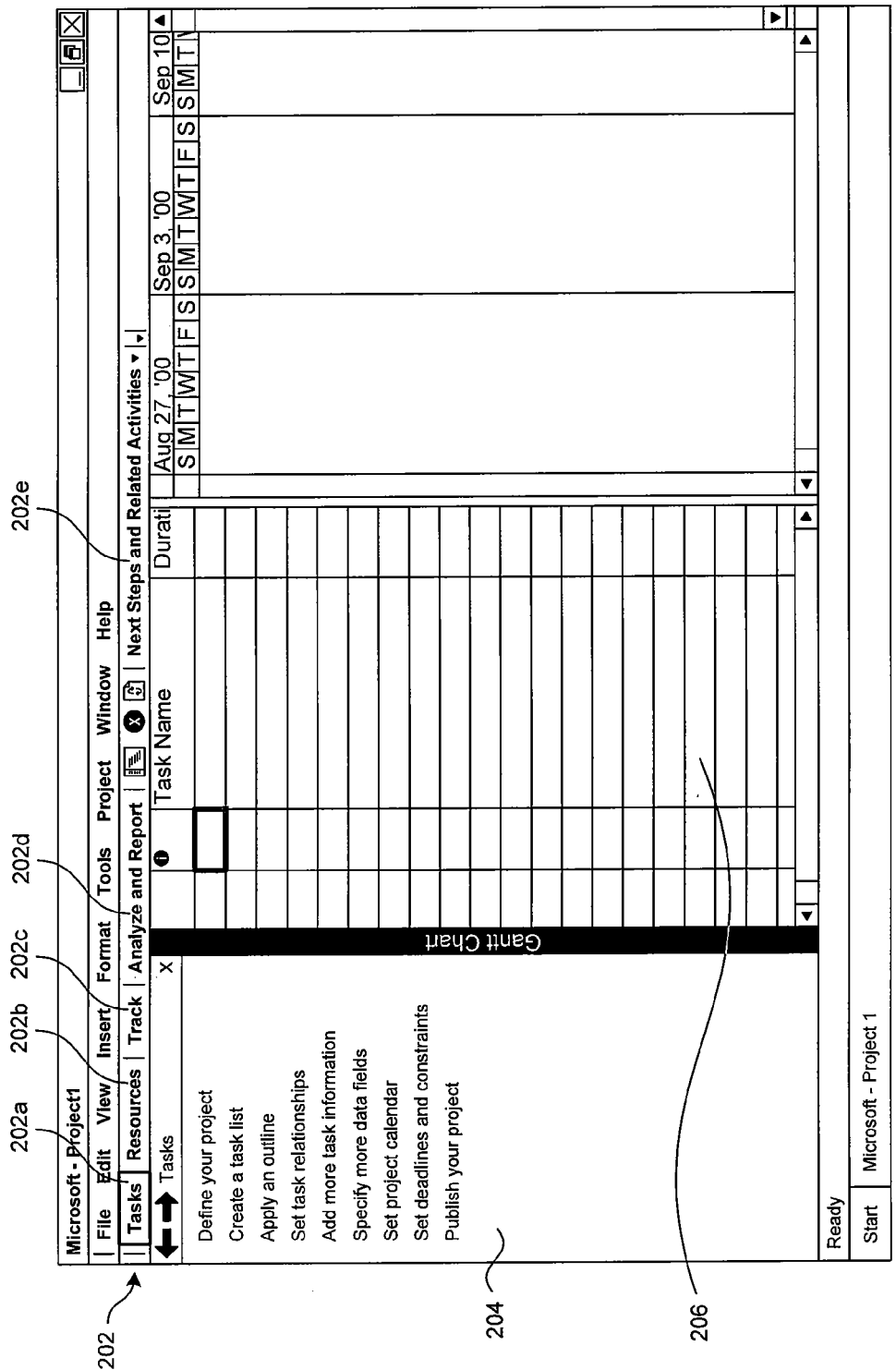
FIG. 2 is a display screen of a representative user interface constructed according to an exemplary embodiment of the present invention.

FIG. 2 is a display screen of a representative user interface 200 constructed according to an exemplary embodiment of the present invention. Referring now to FIG. 1 and FIG. 2, the exemplary user interface 200 comprises a goal bar 202, a side pane 204, and a main viewing area 206. The goal bar 202 comprises goal area controls 202a-202d, which allow the end user to navigate to the main functional areas of the program module 37N. Selecting a goal area 202a-202d can change the display content of a side pane 204 to comprise a list of activities for completing the selected goal area. The goal bar 202 also can comprise a menu control 202e, which can provide a drop down menu of items related to the information currently displayed in the side pane.

Selecting an activity from the list of activities in the side pane 204 can change the display content of the side pane 204 to show information for performing the selected activity. In an exemplary embodiment, the side pane 204 can comprise content other than a list of activities. For example, the side pane 204 can comprise any of the following: (1) controls such as radio buttons, push buttons, text entry boxes, dropdown lists, or other controls to interact with the program module 37N and its data via a script or macro; (2) textual information such as domain knowledge, help information, or other text; (3) popup definitions and tool tips to explain terminology; (4) a link to a help topic, and (5) a control associated with computer software code for executing an application program interface ("API").

The main viewing area 206 comprises views of the program module 37N in which the end user views, edits, and performs work. For example, the main viewing area 206 can change to correspond to a selected goal area control 202a-202d or a selected activity from the side pane 204. In an exemplary embodiment, the main viewing area 206 can comprise a view displaying an ActiveX® control associated with functionality of the program module 37N. Alternatively, the main viewing area 206 can comprise a web browser based view, or a combination of the web browser based view and the ActiveX® control.

The exemplary embodiment illustrated in FIG. 2 comprises a user interface for a project management-type program module, such as the "PROJECT" program distributed by Microsoft Corporation of Redmond, Wash. In that exemplary embodiment, the goal area controls 202a-202d can comprise "Tasks," "Resources," "Track," and "Analyze and Report," respectively. Those goal areas can represent the major project management phases of planning tasks, managing resources, tracking the project once it is underway, and reporting and analyzing project data. As shown in FIG. 2, the end user has selected the "Tasks" goal area control 202a, causing the program module 37N to display a corresponding list of task-related activities in the side pane 204 that should be completed to plan the tasks in a project. For example, representative activities for a project management environment comprise defining the project, creating a task, and scheduling each task. The main viewing area 206 displays a work area for the end user to create and edit project tasks.

The description provided below for FIGS. 3-9 references the representative user interface of FIG. 2 to illustrate exemplary features of a user interface according to exemplary embodiments of the present invention.

Figure 3:
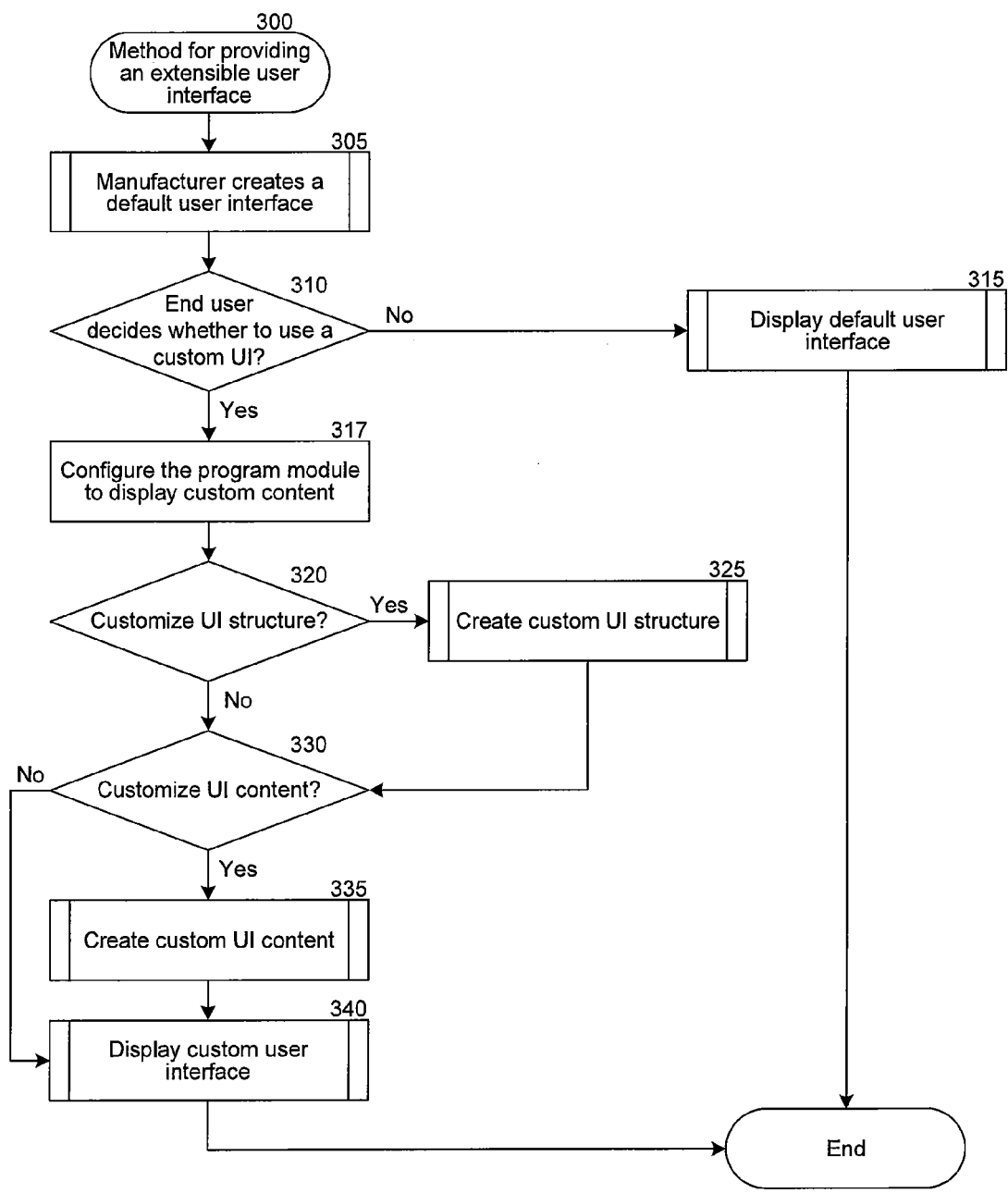
FIG. 3 is a flow chart depicting a method for providing an extensible user interface according to an exemplary embodiment of the present invention.

FIG. 3 is a flow chart depicting a method 300 for providing an extensible user interface according to an exemplary embodiment of the present invention. Turning to FIGS. 1, 2 and 3, in step 305, a computer software programmer creates a default user interface for the program module 37N. For example, the programmer can create the default user interface during the original development of the computer software code for the program module, thereby resulting in the delivery to an end user of a program module having the default user interface. Thus, the default user interface comprises the user interface provided by the manufacturer of the program module 37N. Additionally, the default user interface can comprise default error pages for use if a custom user interface performs a task not recognized by the program module 37N. The program module 37N then comprises the default user interface when installed in the personal computer 10 of an end user. The end user typically comprises a business or an individual consumer. In step 310, the end user chooses whether to customize the user interface of the program module 37N. If not, then the method branches to step 315, in which the program module 37N displays the default user interface.

If the end user decides in step 310 to customize the program module's user interface by modifying the default file of the program module, then the method branches to step 317. In step 317, the end user configures the program module 37N to reference and display a custom user interface, rather than the default user interface. For example, the program module 37N can comprise an options screen in which the user can select a "use custom interface" control. Additionally, the options screen can comprise an entry field in which the user can input the location of the custom files supporting the custom user interface.

Figure 10:
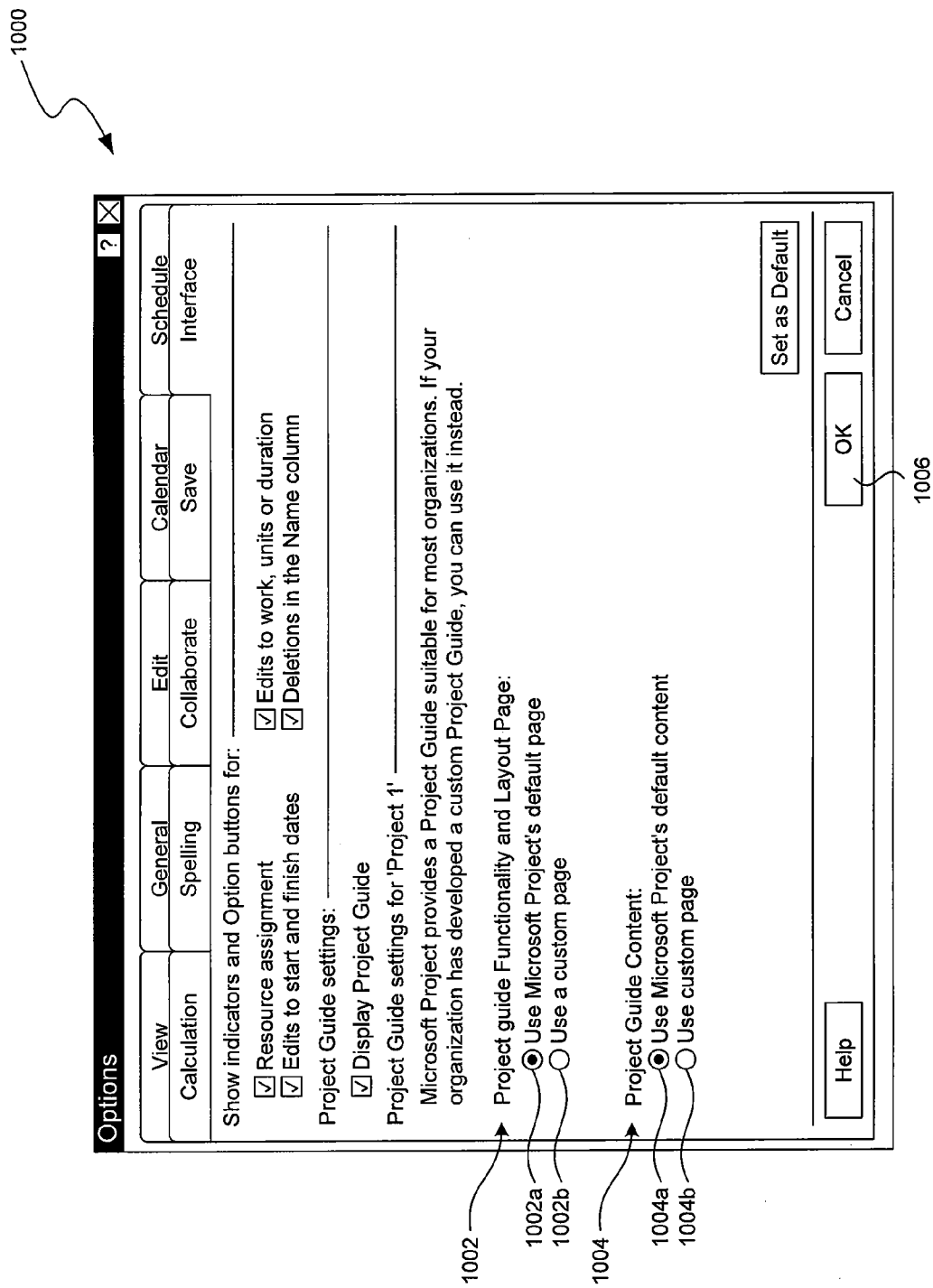
FIG. 10 is a display screen of a representative dialogue constructed according to an exemplary embodiment of the present invention.

In an exemplary embodiment, the options screen can comprise a user interface dialogue that can allow the end user to select the default user interface or a custom user interface. FIG. 10 is a display screen of a representative dialogue 1000 constructed according to an exemplary embodiment of the present invention. As shown, the end user can select from dialogue elements 1002 and 1004 of dialogue 1000 to customize the user interface structure and/or content. The end user can select dialogue element 1002a to use the default user interface structure or dialogue element 1002b to use custom user interface structure. Additionally, the end user can select dialogue element 1004a to use the default user interface content or dialogue element 1002b to use custom user interface content. In an exemplary embodiment, the dialogue 1000 can comprise a text box (not shown) in which the end user can specify a location of custom structure or content files for use by the program module 37N to implement the custom user interface structure or content.

The dialogue 1000 can allow an end user to switch between user interfaces without restarting the program module 37N. In operation, the program module 37N can load the desired interface after the user selects the "OK" control 1006 from the dialogue 1000. Additionally, the dialogue 1000 can be associated with an individual program module file. Accordingly, the program module 37N can load the appropriate default or custom user interface associated with the program module file when opening that program module file.

The method 300 then proceeds to step 320. In step 320, the end user determines whether to customize the user interface structure. The user interface structure can comprise the general makeup of the user interface 200 (FIG. 2). For example, as shown in FIG. 2, the user interface structure can comprise a frame set indicating the position of the side pane 204 and the position of the main viewing area 206. The goal bar 202 can be generated as a tool bar of the program module 37N. However, the present invention is not limited to that user interface structure. For example, the user interface structure can comprise positioning and layout information for different types of user interfaces. In an exemplary embodiment, the user interface structure can comprise arbitrary HTML code. The user interface structure also can comprise a reference to an identification number of content items for display in the user interface 200. For example, the content items can comprise goal area controls 202a-202d of the goal bar 202, as well as content items for display in the side pane 204.

If the end user determines in step 320 to customize the user interface structure, then the method branches to step 325. In step 325, the end user creates the custom user interface structure for the user interface of the program module 37N. For example, the end user can modify the positions of the side pane 204 and main viewing area 206. Additionally or alternatively, the end user can modify or add content item refer-
ences to change the specified content for display in the user interface. After creating the custom user interface structure, the method branches to step 330. If the end user decides in step 320 not to customize the user interface structure, then the method branches directly to step 330.

In step 330, the end user determines whether to customize the user interface content of the program module 37N. The user interface content can comprise the content items displayed in the user interface 200 in the positions specified by the user interface structure. For example, the user interface content can comprise the names of the goal area controls 202a-202d on the goal bar 202. Additionally, the content can comprise the content associated with a particular content item and displayed in the side pane 204.

If the end user decides in step 330 to customize the content of the user interface, then the method branches to step 335. In step 335, the end user creates custom user interface content. For example, the end user can modify the content items referenced by the user interface structure, thereby modifying the content displayed in the user interface. Additionally or alternatively, the end user can modify additional content associated with the content item, thereby customizing the content displayed when a user selects the content item. The end user also can add content to the custom user interface.

The method 300 then proceeds to step 340 in which the program module 37N displays the custom user interface. If the end user decides in step 330 not to customize the user interface content, then the method branches directly to step 340. The displayed custom user interface comprises the custom user interface structure and/or the custom user interface content created in steps 325 and 335, respectively.

Figure 4:
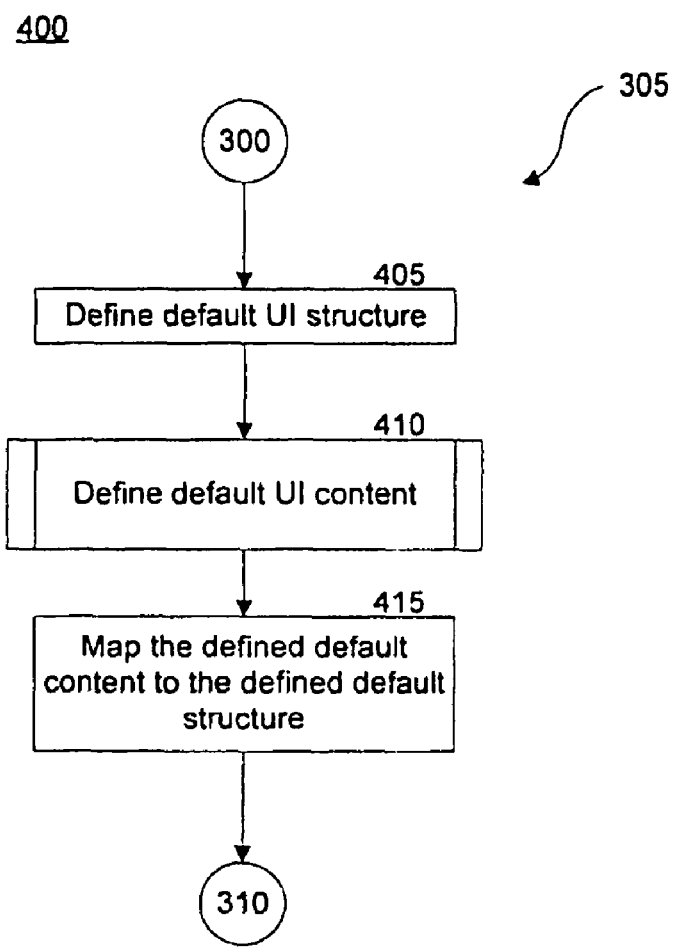
FIG. 4 is a flow chart depicting a method for creating a default user interface according to an exemplary embodiment of the present invention.

FIG. 4 is a flow chart depicting a method 400 for creating a default user interface according to an exemplary embodiment of the present invention, as referred to in step 305 of FIG. 3. Turning now to FIGS. 1, 2 and 4, in step 405, the computer software programmer defines a default user interface structure, typically during the software code development phase for the associated program module. In an exemplary embodiment, the programmer can define the default structure in a default structure definition file. The default user interface structure can comprise the structure discussed above. For example, as shown in FIG. 2, the user interface structure can comprise a frame set indicating respective positions of the side pane 204 and the main viewing area 206. The user interface structure also can identify content items for display in the user interface 200. For example, the content items can comprise items displayed in the goal area controls 202a-202d of the goal bar 202.

In step 410, the computer software programmer defines default user interface content for display in the user interface. In an exemplary embodiment, the content can comprise the content items displayed in the user interface in the positions specified by the user interface structure. For example, the user interface content can comprise the names of the goal area controls 202a-202d on the goal bar 202 for the representative user interface illustrated in FIG. 2. The content also can comprise the content associated with a particular content item and displayed in the side pane 204. In an exemplary embodiment, the programmer can define content items in a default content definition file. Additionally, the programmer can define display content associated with respective content items in one or more content display files. The display content can be displayed in the side pane 204 upon selection of the content item by the end user.

The method 400 then proceeds to step 415. In step 415, the computer software programmer maps the defined default content to the defined default structure. In an exemplary embodiment, the mapping step involves providing an identification number for each content item in the default content definition file. Then, the programmer inserts a reference to the content item identification number in the desired position of the structure definition file. Accordingly, the default structure definition file can indicate the position to display a desired content item by referencing the content item's identification number. The method then proceeds to step 310 (FIG. 3).

Figure 5:
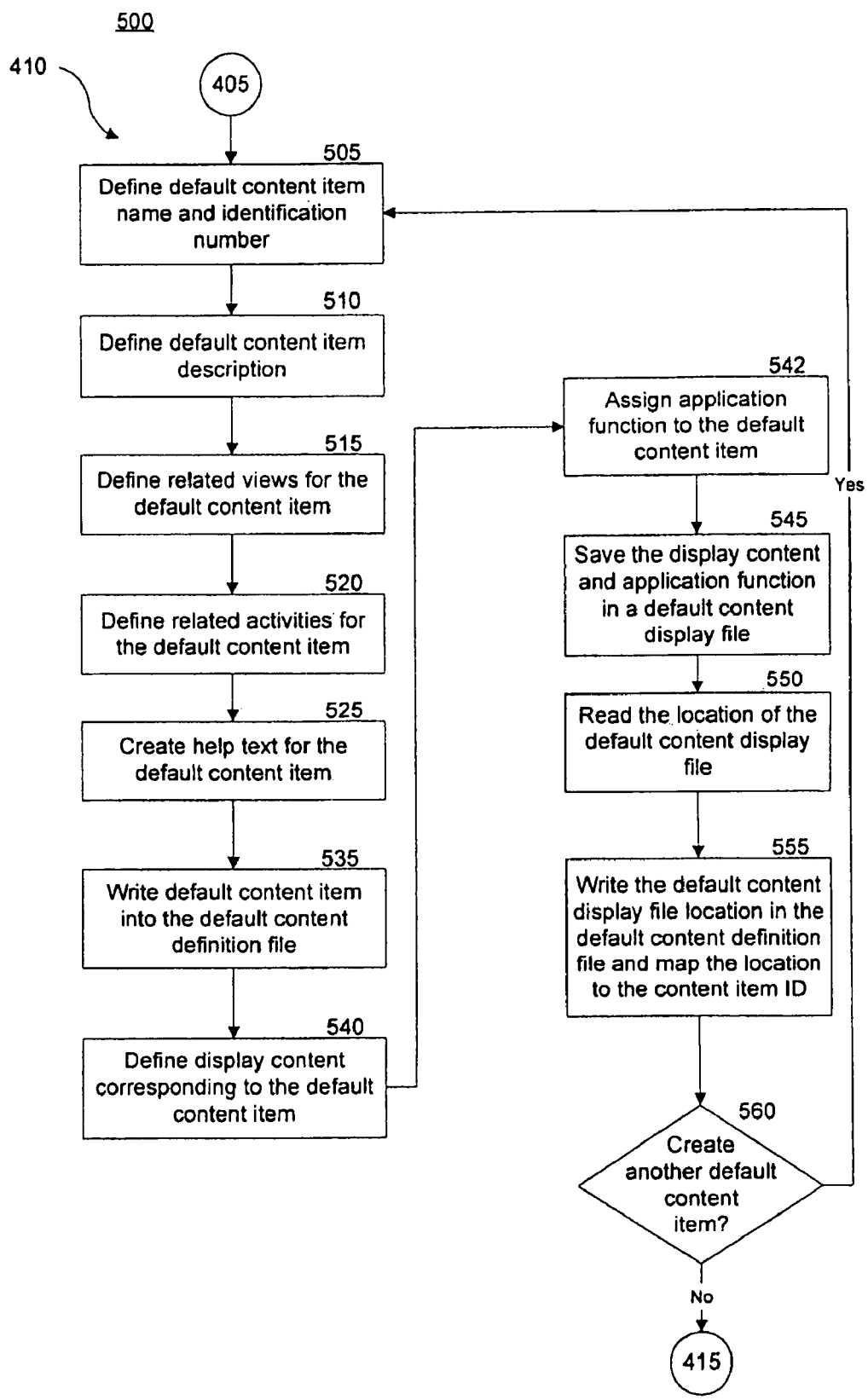
FIG. 5 is a flow chart depicting a method for defining default user interface content according to an exemplary embodiment of the present invention.

FIG. 5 is a flow chart depicting a method 500 for defining default user interface content according to an exemplary embodiment of the present invention, as referred to in step 410 of FIG. 4. With reference to FIGS. 1, 2 and 5, in step 505, the computer software programmer defines a default content item name and identification number. As best shown by the example in FIG. 2, the computer software programmer can define a content item name "tasks" for the goal bar area 202a and can assign an identification number "10" to that content item. In step 510, the computer software programmer defines a default content item description for the content item. For example, the programmer can describe the "tasks" content item as "a list of all task-related items for developing a project."

In step 515, the programmer can define related views for the default content item. In that regard, the programmer can define a view type of the main viewing area 206 for which the content item is relevant. In operation, the program module 37N can cross-check the view type displayed in the main viewing area 206 and can display content for a related view type in the side pane 204. For example, in the exemplary user interface illustrated in FIG. 2 for a project management-type program module, the view types can comprise a task-type view and a resources-type view. The "tasks" content item with identification number "10" can have a defined task-type view content. As shown in FIG. 2, the end user has selected the "tasks" goal area control 202a, leading to the display of the corresponding task list content in the side page 204. The program module 37N also displays in the main viewing area 206 an appropriate task-type view having functional content for developing a task. If the end user subsequently selects a main view having a resource-type view, the program module 37N can determine that the current task-type view content in the side pane 204 is not proper for a resource-type view in the main viewing area 206. Accordingly, the program module 37N can replace the task-type view content in the side pane 204 with a relevant resource-type view content.

In step 520, the computer software programmer defines related activities for the default content item. The related activities can indicate related content items to display in the "next steps and related activities" menu control 202e of the goal bar 202. For example, for a content item of "create a task list" shown in the side pane 204, related activities can comprise "create a recurring task" or "import task list from another application." Accordingly, relating those content items to the create a task list content item indicates that the menu control 202e should display those items when displaying the "create a task list" content item in the side pane 204.

In step 525, the programmer creates help text for the default content item. For example, the programmer can create a content display file comprising the help text. Then, the programmer can define the help text content display file location in the content definition file and can relate that link to the content item. Accordingly, the program module 37N can display the help text link while displaying the related content item.

In step 535, the programmer writes the items defined in steps 505-525 for the content item into the default content definition file.

Then, in step 540, the programmer defines display content corresponding to the default content item. As shown in FIG. 2, the display content can comprise the content displayed in the side pane 204 when the end user selects the content item.

In step 542, the programmer can assign functionality from the program module 37N to the default content item. In that regard, the programmer can create a script or macro that executes in connection with loading of the default content item. The script can call any functionality of the program module 37N. In an exemplary embodiment, a script or macro can call an application program interface of the program module 37N. For example, the "create a task list" content item can include a script that calls the "create a task list" function of a project application and displays the "create a task list" screen in the main viewing area 206 of the user interface 200.

In step 545, the programmer saves the display content and application function in a default content display file. In step 550, the programmer reads the location of the default content display file, which comprises the file path of the default content display file. Then, in step 555, the programmer writes the default content display file location in the default content definition file and maps the location to the content item identification number.

In an exemplary embodiment of steps 540-555, for the "tasks" content item in the goal area control 202a of the user interface 200 of FIG. 2, the programmer can define the display content for the side pane 204 corresponding to the "tasks" content item. The programmer can save the display content in a content display file and can associate the content display file location with the content item in the default content definition file. In operation, if the end user selects the goal area control 202a for the "tasks" content item, the program module 37N can display the corresponding display content from the content display file in the side pane 204. Selection of the content item can trigger a search for the content item's identification number in the default content definition file. Then, after finding the content item's identification number in the default content definition file, the program module 37N can link to the associated content display file location and can load and display the side pane content from the default content display file.

The method then proceeds to step 160. In step 560, the programmer determines whether to create another default content item. In that regard, the computer software programmer can create another default content item for each content item of the user interface 200 in FIG. 2. For example, the programmer can create a content item for each goal area control 202a-202d of the goal bar 202, as well as each item listed in the corresponding side pane 204 for each of the content items 202a-202e. The programmer also can create the corresponding display content for each content item. The display content can comprise the additional content items displayed in the side pane 204 upon selection of the corresponding content item from either the goal bar 202 or the side pane 204. Accordingly, the method branches back to step 505 to repeat the process for each content item. After the programmer has created all default content items, then the method proceeds to step 415 (FIG. 4).

Figure 6:
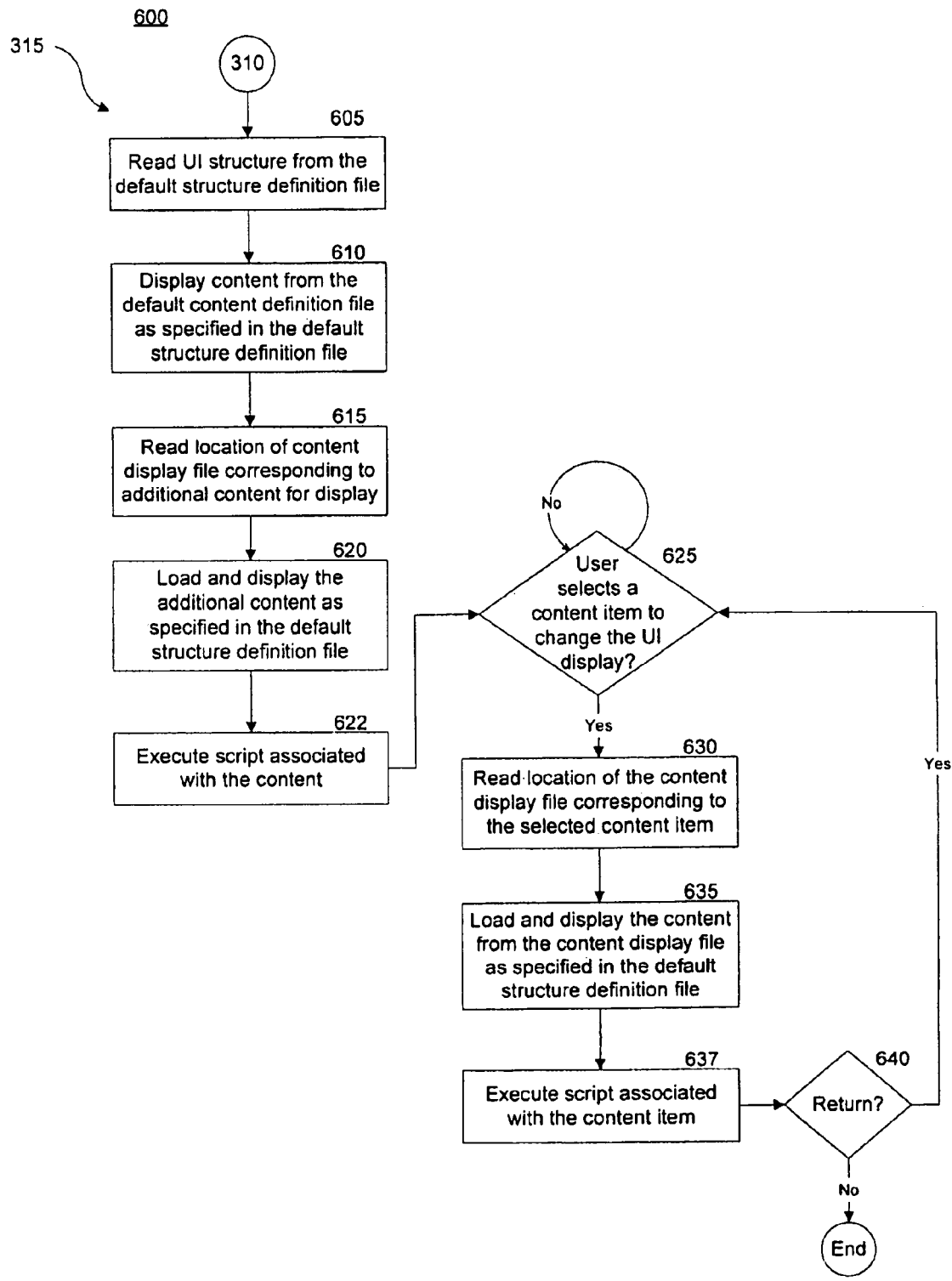
FIG. 6 is a flow chart depicting a method for displaying a default user interface according to an exemplary embodiment of the present invention.

FIG. 6 is a flow chart depicting a method 600 for displaying a default user interface according to an exemplary embodiment of the present invention, as referred to in step 315 of FIG. 3. Referring to FIGS. 1, 2 and 6, in step 605, the application program 37N reads the user interface structure from the default structure definition file. In an exemplary embodiment, the default structure definition file is implemented by a main hyper text markup language ("HTML") type file defining the positions of the side pane 204 and the main viewing area 206 for the user interface illustrated in FIG. 2. Additionally, the main HTML type file can reference the identification number of content items displayed in the goal bar 202, the side pane 204, and the main viewing area 206. Accordingly, in step 605, the program module 37N can read the position the side pane 204 and the main viewing area 206 and the identification number of content items to be displayed in those frames, as well as the identification number of content items to be displayed in the goal bar 202.

Then, in step 610, the program module 37N can display content from the default content definition file as specified in the default structure definition file. In that regard, the program module 37N can search the default content definition file for the identification number of each content item referenced in the default structure definition file. The program module 37N then can display the content item associated with the identification number in the position specified by the default structure definition file.

In an exemplary embodiment, the default content definition file is implemented by an extensible markup language ("XML") type file. In a specific exemplary embodiment, the main HTML type file can comprise a position referencing identification number "10," indicating the content item for display in the goal area 202a of the goal bar 202, as shown in FIG. 2. The XML content definition file can indicate that the identification number "10" corresponds to the content item "tasks." Accordingly, the program module 37N can display the content item "tasks" in the goal area 202a of the goal bar 202, as specified in the main HTML type file.

In step 615, the program module 37N reads the location of a content display file comprising additional content corresponding to the content item. The additional content for display can comprise the content displayed in the side pane 204. In an exemplary embodiment, the program module 37N can read the location of the content for the side pane 204 from the default content definition file.

Then, in step 620, the program module 37N loads the additional content from the content display file and displays that content as specified in the default structure definition file. In an exemplary embodiment, the content display file is implemented by an HTML type file. Accordingly, the program module 37N can display the HTML content in the side pane 204 for the user interface 200 shown in FIG. 2.

In step 622, the program module 37N can execute a script or macro associated with the default content to initiate functionality assigned to the default content. For example, the script assigned to the "Tasks" content shown in the side pane 204 can comprise steps accessing functionality of the program module 37N to display in the main viewing area 206 the appropriate view for the "Tasks" content.

The method 600 then proceeds to step 625 in which the program module 37N determines whether the end user has selected a content item in the user interface 200 to change the user interface display. For example, the end user can select any one of the content items in goal area controls 202a-202d of the goal bar 202. Alternatively, the end user can select any of the content items in the side pane 204. The program module 37N repeats step 625 until the user selects one of the content items.

When user selects one of the content items, the method 600 branches to step 630. In step 630, the program module 37N reads the location of the content display file corresponding to the selected content item. In an exemplary embodiment, the program module 37N can determine the identification number of the selected content item referenced in the default structure definition file. Then, the program module 37N can search the default content definition file for the identification number of the content item. After finding the content item's identification number in the default content definition file, the program module 37N then links to the corresponding content display file comprising the display content for the selected content item.

In step 635, the program module 37N loads and displays the content from the content display file corresponding to the selected content item, as specified in the default structure definition file. For example, if the user selects the "create a task list" content item from the side pane 204, then the program module 37N can change the side pane 204 to display the content corresponding to the selected content item. In that regard, the side pane 204 can display an HTML type file comprising the steps for creating a task list, which is the display content associated with the "create a task list" content item.

In step 637, the program module 37N can execute a script or macro associated with the content item to initiate functionality assigned to the content item. For example, the script assigned to the "create a task list" content item shown in the side pane 204 can comprise steps accessing functionality of the program module 37N to display in the main viewing area 206 the appropriate view for creating a task list.

The method then proceeds to step 640. In step 640, the program module 37N enters a return loop back to step 625 to wait for the end user to select another content item to change the user interface display. When the end user exits the program module 37N, then the method branches out of step 640 and ends.

In an exemplary embodiment, the program module 37N typically comprises a program module, such as a web browser, which can display the HTML content described above in the user interface 200 of FIG. 2.

Figure 7:
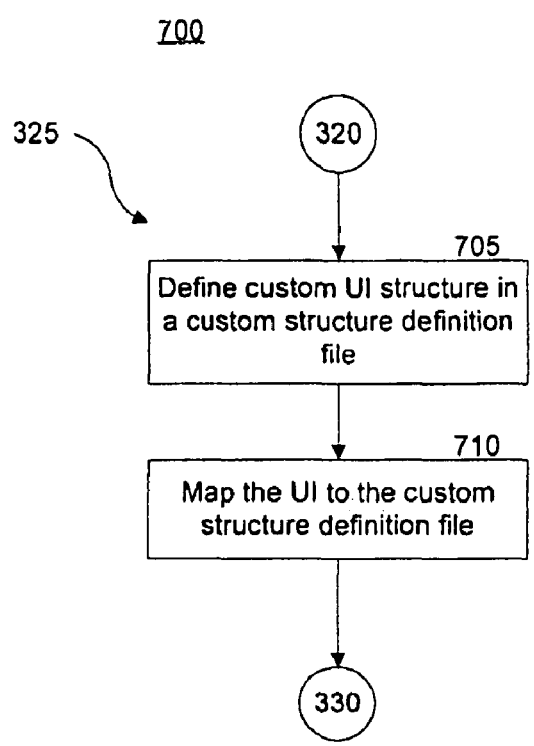
FIG. 7 is a flow chart depicting a method for creating custom user interface structure according to an exemplary embodiment of the present invention.

FIG. 7 is a flow chart depicting a method 700 for creating custom user interface structure according to an exemplary embodiment of the present invention, as referred to in step 325 of FIG. 3. As shown in FIGS. 1, 2 and 7, in step 705, the end user defines custom user interface structure in a custom structure definition file. In an exemplary embodiment, the end user can modify the default structure definition file and can save the modified file as a custom structure definition file. For example, the end user can change the default HTML structure definition file to place the side pane 204 on the right side of the main viewing area 206. In an alternative exemplary embodiment, the end user can create an entirely new structure definition file and can save that file as the custom structure definition file.

Then, in step 710, the end user maps the user interface to the custom structure definition file. In an exemplary embodiment, the end user can configure the program module 37N to reference the location of the custom structure definition file, rather than the default structure definition file. The method 700 then proceeds to step 330 (FIG. 3).

Figure 8:
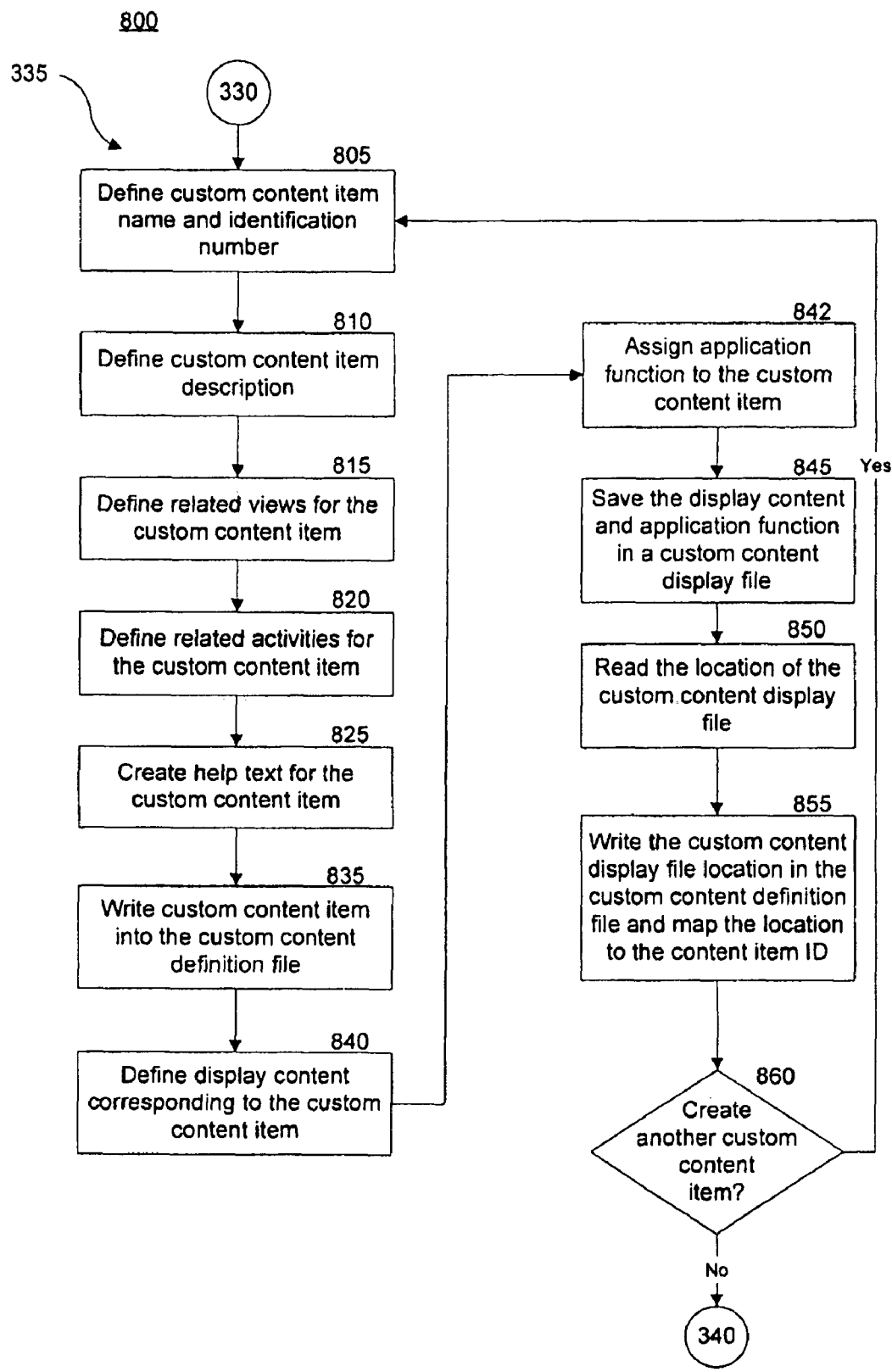
FIG. 8 is a flow chart depicting a method for creating custom user interface content according to an exemplary embodiment of the present invention.

FIG. 8 is a flow chart depicting a method 800 for creating custom user interface content according to an exemplary embodiment of the present invention, as referred to in step 335 of FIG. 3. In an exemplary embodiment, the end user can create custom content by modifying default content files of the program module 37N. For example, the end user can modify default content files by modifying the default content definition file and/or a referenced default content display file and can save the modified file as a custom content file. As another example, the end user can modify default content files by creating a new custom content definition file or a new custom content display file to replace or supplement the default content files.

If the end user creates a custom content definition file, then the end user can modify the default or custom structure definition file to reference the custom content definition file. Additionally or alternatively, if the end user creates a custom content display file, then the end user can modify the default or custom content definition file to reference the new custom content display file.

FIG. 8 illustrates a method for creating custom content and applies to creating a complete custom content definition file or custom content display file, or to modifying the default content definition file or a custom content display file to include new or modified content items. In that regard, the method illustrated in FIG. 8, in which an end user creates custom content, comprises steps similar to those illustrated in FIG. 5, in which the programmer created the user interface content.

Referring to FIGS. 1, 2 and 8, in step 805, the end user defines a custom content item name and identification number. For example, to add a custom content item to the task activity list illustrated in the side pane 204 of FIG. 2, the end user can define a custom content item name such as "my tasks" for the side pane 204 and can assign an identification number "20" to that content item. In step 810, the end user defines a custom content item description for the custom content item. For example, the end user can describe the "my tasks" custom content item as "a list of all task-related items for developing my personal project."

In step 815, the end user can define related views for the custom content item. For example, the end user can define a view type of the main viewing area 206 for which the custom content item is relevant. In operation, the program module 37N can cross check the view type content displayed in the main viewing area 206 and can display a related view type content in the side pane 204, as discussed above with reference to FIG. 5. For example, the user can define the custom content item "my tasks" to have a task-type view content.

In step 820, the end user defines related activities for the custom content item. The related activities can indicate related content items to display in the "next steps and related activities" control 202e of the goal bar 202, as discussed above with reference to FIG. 5. In step 825, the end user can create help text for the custom content item. For example, the end user can create a content display file containing the help text. Then, the end user can define the help text content display file location in the content definition file and can relate that link to the custom content item. Accordingly, the program module 37N can display the help text link while displaying the related custom content item.

In step 835, the end user writes the items defined in steps 805-825 for the custom content item into the custom content definition file. Then, in step 840, the end user defines display content corresponding to the custom content item. The display content can comprise the content displayed in the side pane 204 upon selection of the custom content item by the end user.

In step 842, the end user can assign functionality from the program module 37N to the custom content item. In an exemplary embodiment, the end user can create a script or macro that executes in connection with loading of the custom content item. The script or macro can call any functionality of the program module 37N. For example, the "my tasks" custom content item can include a script that calls the create task list function of a project application and displays the create task list screen in the main viewing area 206 of the user interface 200.

In step 845, the end user saves the display content and application function in a custom content display file. In step 850, the end user reads the location of the custom content display file, which comprises the file path of the custom content display file. Then, in step 855, the end user writes the custom content display file location in the custom content definition file and maps the location to the content item identification number.

In an exemplary embodiment of the steps 840-855, for the "my tasks" custom content item being added to the side pane 204, the end user can define the display content for the side pane 204 corresponding to the "my tasks" content item. The end user can save the display content in a content display file and can associate the content display file location with the content item in the custom content definition file. In operation, if the end user selects the "my tasks" content item from the side pane 204, the program module 37N can change the side pane display to the corresponding display content from the content display file. Selection of the custom content item can trigger a search for the custom content item's identification number in the custom content definition file. Then, after finding the content item's identification number in the custom content definition file, the program module 37N can link to the associated content display file location and can load and display the side pane content from the custom content display file.

The method 800 of FIG. 8 then proceeds to step 860. In step 860, the end user determines whether to create another custom content item. In that regard, the end user can create another custom content item for each content item of the user interface 200 shown in FIG. 2. For example, the end user can create a content item for each goal area control 202a-202d of the goal bar 202, as well as each item listed in the corresponding side pane 204 for each of the content items 202a-202e. The end user also can add custom content items not included in the default user interface. The end user can assign custom functionality of the program module to a custom content item. Additionally, the end user can create the corresponding display content for each custom content item. Accordingly, the method 800 branches back to step 805 to repeat the process for each custom content item. After the end user has created all custom content items, the method 800 proceeds to step 340 (FIG. 3).

In an exemplary embodiment, the custom structure definition file and any custom content display files comprise an HTML file type, and the custom content definition file comprises an XML file type, as discussed above with reference to the default user interface. The end user can modify, add, or create HTML and XML files without decompiling the computer software code of the program module.

Figure 9:
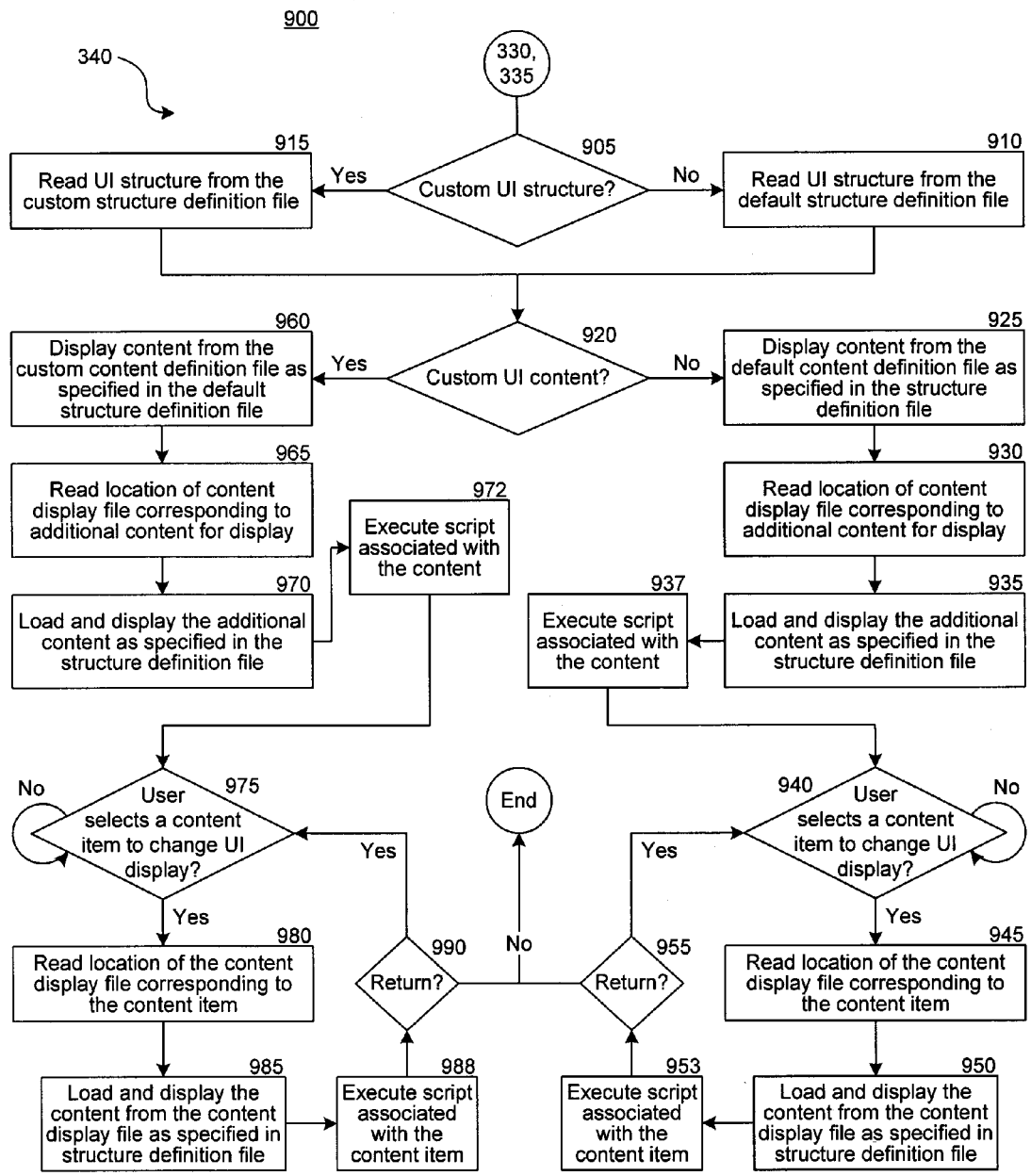
FIG. 9 is a flow chart depicting a method for displaying a custom user interface according to an exemplary embodiment of the present invention.

FIG. 9 is a flow chart illustrating a method 900 for displaying a custom user interface according to an exemplary embodiment of the present invention, as referred to in step 340 of FIG. 3. With reference to FIGS. 1, 2 and 9, in step 905, the program module 37N determines whether to use custom user interface structure. The program module 37N can make that determination by reading the file location of the configured structure definition file. If the structure file location comprises the default structure definition file, then the method branches to step 910. In step 910, the program module 37N reads the user interface structure from the default structure definition file. The method then proceeds to step 920. If the structure file location comprises a file location for a custom structure definition file, then the method branches from step 905 to step 915. In step 915, the program module 37N reads the user interface structure from the custom structure definition file. The method 900 then proceeds to step 920.

In step 920, the program module 37N determines whether to display custom user interface content in the user interface.

If not, then the method branches to step 925 to display default user interface content. In step 925, the program module 37N displays content from the default content definition file as specified in the structure definition file. The structure definition file can comprise either the default or the custom structure definition file, as determined above in step 905. In an exemplary embodiment, the program module 37N can search the default content definition file for the identification number of each content item referenced in the structure definition file. The program module 37N then can display the content item associated with the identification number in the position specified by the structure definition file.

In step 930, the program module 37N reads the location of a content display file comprising additional content corresponding to a content item. The additional content for display can comprise the content displayed in the side pane 204. In an exemplary embodiment, the program module 37N can read the location of the content for the side pane 204 from the default content definition file.

In step 935, the program module 37N loads the additional content from the content display file and displays that content as specified in the structure definition file. In an exemplary embodiment, the content display file comprises an HTML type file. Accordingly, the program module 37N can display the HTML content in the side pane 204.

In step 937, the program module 37N can execute a script or macro associated with the default content to initiate functionality assigned to the default content. For example, the script assigned to the "Tasks" content shown in the side pane 204 can comprise steps accessing functionality of the program module 37N to display in the main viewing area 206 the appropriate view for the "Tasks" content.

The method 900 then proceeds to step 940 in which the program module 37N determines whether the end user has selected a content item in the user interface 200 to change the user interface display. For example, the end user can select any one of the content items in goal area controls 202a-202d of the goal bar 202. Alternatively, the end user can select any of the content items listed in the side pane 204. The program module 37N repeats step 940 until the end user selects one of the content items.

When the end user selects one of the content items, the method 900 branches to step 945. In step 945, the program module 37N reads the location of the content display file corresponding to the selected content item. In an exemplary embodiment, the program module 37N can determine the identification number of the selected content item referenced in the structure definition file. Then, the program module 37N can search the default content definition file for the identification number of the content item. After finding the content item's identification number in the default content definition file, the program module 37N can link to the corresponding content display file comprising the display content for the selected content item.

In step 950, the program module 37N loads and displays the display content from the content display file corresponding to the selected content item, as specified in the structure definition file. For example, if the user selects the "create a task list" content item from the side pane 204, then the program module 37N can change the side pane 204 to display the content corresponding to the selected content item. In an exemplary embodiment, the display content associated with the "create a task list" content item comprises an HTML-type file including instructions for creating a task list, which the program module can load and display in the side pane 204.

In step 953, the program module 37N can execute a script or macro associated with the content item to initiate functionality assigned to the content item. For example, the script assigned to the "create a task list" content item shown in the side pane 204 can comprise steps accessing functionality of the program module 37N to display in the main viewing area 206 the appropriate view for creating a task list.

The method 900 then proceeds to step 955. In step 955, the program module 37N enters a return loop back to step 940 to wait for the end user to select another content item to change the user interface display. When the end user exits the program module 37N, the method 900 branches out of step 955 and ends.

Referring back to step 920, if the program module 37N in FIG. 1 determines that the user interface comprises custom content, then the method branches to step 960. In step 960, the program module 37N can display content from the custom content definition file as specified in the structure definition file. The structure definition file can comprise either the default or the custom structure definition file, as determined above in step 905. In an exemplary embodiment, the program module 37N can search the custom content definition file for the identification number of each content item referenced in the structure definition file. The program module 37N then can display the content item associated with the identification number in the position specified by the structure definition file.

In step 965, the program module 37N reads the location of a content display file comprising additional content corresponding to a content item. The additional display content can comprise the content displayed in the side pane 204. In an exemplary embodiment, the program module 37N can read the location of the display content for the side pane 204 from the custom content definition file.

Then, in step 970, the program module 37N loads the additional content from the content display file and displays that content as specified in the structure definition file. In an exemplary embodiment, the content display file can comprise an HTML type file. Accordingly, the program module 37N can display the HTML content in the side pane 204.

In step 972, the program module 37N can execute a script or macro associated with the custom content to initiate functionality assigned to the custom content. For example, the script assigned to the "Tasks" content shown in the side pane 204 can comprise steps accessing functionality of the program module 37N to display in the main viewing area 206 the appropriate view for the "Tasks" content.

The method then proceeds to step 975. In step 975, the program module 37N determines whether the end user has selected a content item in the user interface 200 to change the user interface display. In an exemplary embodiment, the end user can select any one of the content items in goal area controls 202a-202d of the goal bar 202. Alternatively, the end user can select any of the content items listed in the side pane 204. The program module 37N repeats step 975 until the end user selects one of the content items.

When the end user selects one of the content items, then the method branches to step 980. In step 980, the program module 37N reads the location of a content display file corresponding to the selected content item. In an exemplary embodiment, the program module 37N can determine the identification number of the selected content item referenced in the structure definition file. Then, the program module 37N can search the custom content definition file for the identification number of the content item. After finding the content item's identification number in the custom content definition file, the program module 37N can link to the corresponding content display file comprising the display content for the selected content item.

Then, in step 985, the program module 37N loads and displays the content from the content display file corresponding to the selected content item, as specified in the structure definition file. For example, if the user selects the custom "my tasks" content item from the side pane, then the program module 37N can change the side pane 204 to display the content corresponding to the selected content item. In an exemplary embodiment, the display content associated with the custom "my tasks" content item comprises an HTML-type file including options for interacting with the "my tasks" content item, which the program module can load and display in the side pane 204.

The method 900 then proceeds to step 988. In step 988, the program module 37N can execute a script associated with the content item to initiate functionality assigned to the content item. For example, the script assigned to the custom "my tasks" content item displayed in the side pane can comprise steps accessing functionality of the program module 37N to display the appropriate task view in the main viewing area 206.

Then, in step 990, the program module 37N enters a return loop back to step 975 to wait for the end user to select another content item to change the user interface display. When the user exits the program module 37N, then the method 900 branches out of step 990 and ends.

In an exemplary embodiment, if the custom user interface performs a task not recognized by the program module 37N, then the program module 37N can display an appropriate default error page.

As discussed above, the present invention can provide a user interface customizable by an end user. The customized user interface can provide desired formatting, content, and functionality not present in the default user interface. The end user can customize any portion of the default user interface by changing or adding content items, display content, and/or structure. Additionally, the end user can assign program module functionality to customized content.

The present invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the present invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the present invention defined in the following claims, the scope of which is to be accorded the broadest interpretation so as to encompass such modifications and equivalent structures.

What is claimed is:

1. A computer-implemented method for displaying a user interface, comprising the steps of:

creating a custom user interface for a program module by modifying a default user interface for the program module, the default user interface including structure definition information specifying layout for content items, content display information for each content item that specifies display content for the content item, and content definition information mapping content items to content display information for the content items, wherein the modifying includes modifying information of the default user interface;

in response to start-up of the program module, determining whether the program module is configured to display the custom user interface rather than the default user interface; and displaying the custom user interface in response to a determination that the program module is configured to display the custom user interface by:
 displaying content items in the layout specified by the structure definition information; and
 in response to selection of a displayed content item,
  identifying from the content definition information the content display information for the selected content item; and
  displaying the display content as defined by the identified content display information.

2. The method according to claim 1, wherein said step of modifying the default user interface comprises creating a custom file defining at least a portion of the user interface based upon one or more modifications to the default user interface.

3. The method according to claim 1, further comprising the steps of:

associating the custom user interface with a function of the program module; and executing the program module function in connection with displaying the custom user interface.

4. The method according to claim 1, wherein said default user interface comprises a default structure definition file defining user interface structure referencing a first content item, wherein said step of creating a custom user interface comprises modifying the default structure definition file to create a custom structure definition file defining custom user interface structure referencing a second content item, and wherein said step of displaying the custom user interface comprises displaying the second content item according to the custom structure definition file.

5. The method according to claim 4, wherein the first and second content items comprise different content items.

6. The method according to claim 4, wherein the default and custom structure definition files comprise an HTML-type file.

7. The method according to claim 4, wherein said default user interface further comprises a default content display file comprising display content corresponding to the first content item, wherein said step of creating a custom user interface further comprises modifying the default content display file to create a custom content display file comprising custom display content corresponding to the second content item, and wherein said step of displaying the custom user interface further comprises displaying the custom display content corresponding to the second content item according to the custom structure definition file.

8. The method according to claim 7, wherein the default and custom structure definition files and the default and custom content display files comprise an HTML-type file.

9. The method according to claim 1, wherein said default user interface comprises a default content definition file defining a first content item, wherein said step of creating a custom user interface comprises modifying the default content definition file to create a custom content definition file defining a second content item, and wherein said step of displaying the custom user interface comprises displaying the second content item defined in the custom content definition file.

10. The method according to claim 9, wherein the first and second content items comprise different content items.

11. The method according to claim 9, wherein the default and custom content definition files comprise an XML-type file.

12. The method according to claim 9, wherein said default user interface comprises a default content display file comprising display content corresponding to the first content item, wherein said step of creating a custom user interface further comprises modifying the default content display file to create a custom content display file comprising custom display content corresponding to the second content item, and wherein said step of displaying the custom user interface further comprises displaying the custom display content corresponding to the second content item.

13. The method according to claim 12, wherein the default and custom content definition files comprise an XML-type file, and wherein the default content display file and the custom content display file comprise an HTML-type file.

14. The method according to claim 1, wherein said default user interface comprises a structure definition file defining user interface structure referencing one or more content items, a content definition file defining the one or more content items, and a content display file providing display content corresponding to at least one of the one or more content items, wherein said step of creating a custom user interface comprises modifying one of the structure definition file, the content definition file, and the content display file, and wherein said step of displaying the custom user interface comprises displaying the user interface using the file modified in said step of creating a custom user interface.

15. The method according to claim 14, wherein said step of modifying one of the structure definition file, the content definition file, and the content display file comprises modifying existing content in the modified file.

16. The method according to claim 14, wherein said step of modifying one of the structure definition file, the content definition file, and the content display file comprises adding new content to the modified file.

17. The method according to claim 14, wherein the content definition file comprises an XML-type file, and wherein the structure definition file and the content display file comprise an HTML-type file.

18. A computer-readable medium having computer-executable instructions for performing the method of claim 1.

19. A system for displaying a user interface, comprising:

a monitor that displays the user interface; and a processor executing a program module operable to present the user interface for display on the monitor by performing the steps comprising:

reading a structure definition file that references content items for display in the user interface, the structure definition file specifying layout for the content items;

reading a content definition file defining content items referenced in the structure definition file, the content definition file specifying a content display file for each content item, each content display file specifying display content for a content item; and displaying the user interface comprising the content items on the monitor by:

displaying content items in the layout specified by the structure definition file; and in response to selection of a displayed content item, identifying from the content definition file the content display file for the selected content item; and displaying the display content as defined by the identified content display file, wherein at least one of the structure definition file, the content definition file, and a content display file comprise information modified by an end user of the program module.

* * * * *